Patented Jan. 13, 1953

2,625,552

UNITED STATES PATENT OFFICE 2,625,552

2-(2'-HYDROXY-3'-NAPHTHOYLAMINO)-THIOPHENE

Robert Sidney Long, Bound Brook, N. J., assignor to American Cyanamid Company, New York, N. Y., a corporation of Maine No Drawing. Application October 19, 1950, Serial No. 191,083

1 Claim. (Cl. 260—332.2)

This invention relates to a new chemical compound which is useful as an intermediate in making azo dyes and it comprises the beta-hydroxynaphthoic acid derivative of 2-aminothiophene having the following formula:

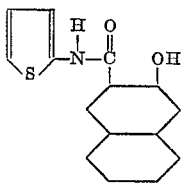

the said 2-(2'-hydroxy-3'-naphthoylamino)-thiophene being stable and capable of coupling with diazo compounds to form azo dyes.

In the past, 2-aminothiophene has been only a laboratory curiosity, as it is very unstable and oxidizes rapidly in air to a solid mass. As a result, it has not been practical to make derivatives of 2-aminothiophene.

According to the present invention, the beta-hydroxynaphthoic acid derivative of 2-aminothiophene, having the formula given above, is prepared by dispersing the tin chloride double salt of 2-aminothiophene in an organic solvent, which is inert to 2-aminothiophene and also to alkali. The tin chloride double salt is then reacted with alkali to produce 2-aminothiophene, which is taken up by the organic solvent. An agent, such as 2-hydroxy-3-naphthoyl chloride, is added, which reacts in situ with the 2-aminothiophene to produce the 2-(2'-hydroxy-3'-naphthoylamino)-thiophene, which then can be recovered from the reaction medium by removing it from the solvent. The new compound so obtained is stable and shows none of the characteristics of great instability, which make 2-aminothiophene a chemical only of theoretical interest.

It is an advantage of the present invention that a wide choice of common, cheap organic solvents is available. In general, it is necessary only that the organic liquid be a solvent and that it react neither with the 2-aminothiophene formed nor with the alkali which is used in the reaction to transform the tin chloride double salt into the free amine. Typical solvents are ethers, such as ethyl ether, aromatic hydrocarbons, such as benzene, toluene, xylene, etc., chlorinated hydrocarbons of the aromatic and aliphatic series, such as monochlorobenzene or ortho-dichlorobenzene, carbon tetrachloride, trichloroethylene and the like.

The new intermediate of the present invention, namely, the 2-(2'-hydroxy-3'-naphthoylamino)-thiophene is a stable compound which can be stored and shipped and which withstands all of the usual procedures involved in using the coupling compounds, either for the production of azo dyes and pigments, or for dyeing procedures, in which they are employed and the color is formed or developed on the goods. It is not known why there should be such an enormous difference in stability between the 2-(2'-hydroxy-3'-naphthoylamino)-thiophene and the free amine itself; and the invention is not intended to be limited to any theory of why so great a difference in characteristics is encountered.

It is an advantage of the present invention that when the new intermediate is coupled to form azoic coloring matters, dyestuffs and pigments of various shades are obtained which, in general, show good fastness properties. Coupling takes place readily with the ordinary diazotized bases, particularly those which are free from solubilizing substituents, such as sulfonic or carboxylic acid groups. Typical amines which can be diazotized and coupled with the new coupling component of the present invention are aniline, its homologs and their halogen, nitro, alkoxy, aryloxy, azo amino, sulfone, sulfonamide and cyano derivatives, xenylamine, the various naphthyl amines, amino azo compounds, benzidine, dianisidine and their derivatives, such as halogen-substituted compounds, derivatives of diaminostilbene and the like. The new coupling component of the present invention also has adequate coupling power for use in polyazo dyestuffs, prepared in successive coupling and diazotizing steps. Excellent stability is shown in all of these reactions. Azoic coloring matters prepared from the new intermediate of the present invention are not claimed, as such, in the present application, but form the subject matter of our copending application, Serial No. 191,084, filed October 19, 1950, simultaneously with the present application.

The invention will be described in greater detail in the following specific example, the parts being by weight unless otherwise specified.

*Example*

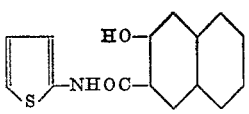

26.6 parts of the tin chloride double salt of 2-aminothiophene is slurried under nitrogen in 100 parts of water and 90 parts of benzene and slowly treated, with cooling, with 120 parts of 5 N sodium hydroxide. The benzene layer is separated, dried over sodium sulfate and treated with 4 parts of pyridine, followed by 10.3 parts of 2-hydroxy-3-napthoyl chloride. The product separates from solution upon treatment with petroleum solvent. It can be purified by dissolving in caustic and precipitating with dilute acid, followed by recrystallization from absolute alcohol.

This product is padded on cotton cloth from alkaline solution and developed with diazotized amines to give dyeings of the following shades:

| Amine | Dyeing |
|---|---|
| 4-benzoylamino-2,5-diethoxyaniline | Blue. |
| dianisidine | Navy Blue. |
| 4-methoxy-4'-aminodiphenylamine | Do. |
| 2-amino-4-chloroanisole | Pink. |
| 2,5-dichloroaniline | Scarlet. |
| 2-methyl-4-nitroaniline | Bluish Red. |
| 2-methyl-5-chloroaniline | Red. |

I claim:

2-(2'-hydroxy-3'-naphthoylamino)-thiophene.

ROBERT SIDNEY LONG.

REFERENCES CITED

The following references are of record in the file of this patent:

Steinkopf: Ann. 448, 214, 221 (1926).

Steinkopf: Die Chemie des Thiophens, pp. 21 and 59, Steinkopf, Dresden, 1941.

Beilstein's handbuch der Organischen Chemie, ed. 4, vol. 12, p. 505, Springer, 1929.